UNITED STATES PATENT OFFICE 2,551,891

DIETHYL-CHLOROBENZAMIDE

Henry Martin, Alfred Margot, Otto Neracher, and Walter Schindler, Basel, and Ernst Hodel, Birsfelden, Switzerland, assignors to J. R. Geigy A. G., Basel, Switzerland, a Swiss firm No Drawing. Application March 29, 1949, Serial No. 84,266. In Switzerland April 9, 1948

1 Claim. (Cl. 260—558)

Chlorobenzamides having the general formula

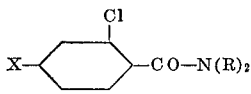

wherein X means a hydrogen or chlorine atom and R means an ethyl or allyl group which have an insect-repellent action of long duration and, furthermore, have no deleterious effects when applied to warm-blooded animals, have not been previously described.

The present invention relates to the preparation of the defined chloro-benzoic acid amides. A further object of the invention is constituted by the insect repellents containing or comprising said chloro-benzoic acid amides. Another object is the preparation of insect repellents comprising as their essential active ingredient a chloro-benzoic acid amide of the defined formula together with one or more suitable carriers. A still further object of the invention is the method of repelling insects consisting in the application of said insect repellent whereby materials and objects as well as animals and human beings may be rendered repellent towards annoying insects and particularly towards mosquitoes. We use the term "mosquito repellent" to signify a repellent not only for mosquitoes proper but also for gnats and flies of all kinds.

The chlorobenzamides as defined can be prepared by methods known per se, in particular by reacting a chlorobenzoic acid of the formula

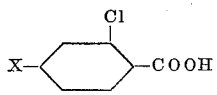

or a salt or a reactive functional derivative thereof with an amine of the formula H—N(R)$_2$ or a salt or reactive derivative thereof.

The process we find most preferable consists in reacting the acid chloride with the amine according to the equation

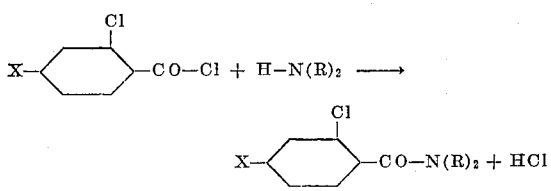

The chlorobenzamides described keep off insects. More precisely expressed, they repel a large number of arthropods troublesome to men and animals because of stinging, biting, blood-sucking or other annoying or dangerous activities, which may also include the carrying of disease germs. For example, the compounds of the invention are effective against Aedinae, Culicidae, stinging-flies, house-flies and bed-bugs. The primary object of these insect repellents is to prevent insects settling on the human skin and stinging. Their most important use is therefore application to the human skin. Application to materials and objects such as textiles or linen, articles of clothing and so on in the neighbourhood of the person to be protected, such as bed-linen, curtains and walls serves the same end. Naturally it is also possible to treat the skin of animals, or any surface desired from which insects are to be kept away, with these compounds.

The chlorobenzamides defined hereinbefore are also particularly suitable for this purpose because they have a low volatility, are practically colourless and when, applied to the skin, cause no skin-irritation or sensitivity to light. They also do not irritate the mucous membrane.

A further advantage of these compounds is that artificial silk materials made from super-polyamides (nylon), staple fibre and viscose are not attacked, so that delicate fabrics made from these materials, such as stockings, can be impregnated with them. An additional point is that the compounds of the invention are practically non-corrosive towards metals and other industrial materials, such as rubber, vulcanised rubber, vinyl chloride polymers, Bakelite and other artificial substances. The compounds can be easily spread on the skin, particularly when diluted, leaving an even, non-fatting film which is not at all unpleasant. This coating causes no spots on linen or if paper is touched.

The insect-repellent chlorobenzamides of the invention can be made up for use in a variety of ways as described in details below. By "active substance" or "ingredient" is to be understood either one of the chlorobenzamides defined, only or a mixture of the same.

Although it is of course possible to use the active substance undiluted it is usually more suitable, both because it renders even distribution easier and on economical grounds, to dilute the active substance with a solid, liquid or semi-solid (ointment-like) carrier which can itself be a mixture of several substances. Such carriers can be of the most varied nature, but should be harmless to warm-blooded animals and particularly to human beings under the conditions of use, i. e., in the quantities and concentrations used in the chosen method of application. Thus the carriers mainly used are those usual for cosmetics. Furthermore, if the agents are employed in a closed space they should not give off any harmful or easily inflammable vapours.

As solid carriers there may be mentioned in particular, pulverulent organic or inorganic substances such as calcium phosphate, calcium carbonate, kaolin, calcined magnesia, kieselguhr, boric acid, cork meal, wood meal and, especially, talc and starch powder. These are impregnated with the active ingredient by known methods. Such dusting-agents are particularly suitable for dusting linen and clothing.

As liquid there come into consideration both organic solvents and inorganic media which fulfill the requirements given above. Organic solvents, such as alcohols, esters, ethers and ketones, e. g., ethanol, propanol, benzyl alcohol, glycerol, propanone-2, butanone-2, cyclohexenol and other hydrated phenols, ethylacetate, glycol-monoethylether, cyclohexanone etc., are suitable as carriers both for use on the skin and for impregnating linen and the like. The form found preferable for repelling insects from the human body is a solution of the compounds according to the invention in low-boiling solvents such as, e. g., isopropanol.

Solutions in oils of vegetable, animal, mineral and synthetic origin, such as, e. g., in olive oil, arachis oil, castor oil and paraffin oil also come into consideration; such oils are useful for addition to solutions in low-boiling solvents.

For use in spraying, the known spray-solvents are particularly suitable, e. g., mineral oil distillates of the kerosene type, hydrogenated naphthalenes and alkylated naphthalenes.

Emulsions and dispersions in an aqueous medium are suitable for purposes of spraying, for impregnating textiles and also for application to the skin. The active substance is mixed for this purpose, if necessary with the addition of organic solvents, with capillary active agents (wetting agents, emulsifiers) which may be of either the anion-active, the cation-active or the non-ionising type. The concentrate can then be diluted with water to give an emulsion, either during manufacture or later on, just before use.

Ointment-like preparations are particularly suitable for application to the human skin. They can be made up either with grease or grease-free and with or without the admixture of solid constituents (such as zinc oxide or titanium dioxide). Greases and waxes of a soft, buttery consistency, such as walrus fat, wool grease, Vaseline, higher fatty alcohols, if necessary, with the addition of liquid organic diluents, such as glycerol or paraffin oil, may be used as semi-solid carriers. For the same purpose may be employed emulsions of the cold-cream type which may contain higher aliphatic alcohols, lipoids, stearins, fatty acid salts, triethanolamine, fatty alcohol sulfonates and the like as emulsifiers, as well as substances that swell of vegetable, animal or synthetic origin, such as cellulose ethers, vegetable mucilages, aluminium hydroxide gel and silica gel. When necessary, surface active compounds may be added to the above semi-solid carriers.

Furthermore, the active substance can be distributed through the air either by fumigating or by the aerosol method of spraying, particularly in order to drive insects out of closed spaces. For fumigation the active ingredient is mixed with a combustible material, e. g., wood charcoal or cellulose and a substance aiding slow combustion, such as potassium nitrate. For the second process it is dissolved in a liquid which is gaseous under atmospheric pressure and at room temperature, such as dichlorodifluoromethane, if necessary with the addition of auxiliary solvents such as cyclohexanone.

The concentration of the active ingredient in these media can be varied within wide limits. The most favourable concentration for use depends on the special conditions under which the agent is to be employed, in particular on the time during which it has to remain effective. In general, concentrations of about 10 to 30% are suitable. For a shorter period and if the density of the gnats is moderate however, a satisfactory effect can be produced with lower concentrations. Higher concentrations are possible or even more suitable in media prepared for the impregnation or spraying of objects or as concentrates for subsequent dilution.

When desired, various additives may be included in the agents described, such as, e. g., further insect-repelling compounds (dialkyl phthalates, 2-ethyl-hexandiol-1.3; $\alpha,\alpha$-dimethyl-$\alpha'$-carbobutoxy-dihydropyran, crotonic acid-N-ethyl-o-toluidide and the like), or anti-sunburn agents (e. g., menthyl salicylate, menthyl anthranilate, phenyl salicylate, quinine salts, umbelliferone and its derivatives, aesculin, salts of naphtholsulfonic acids or pigments such as titanium dioxide), with water-soluble calcium, magnesium and strontium salts such as calcium chloride, with dyestuffs, perfumes, anti-oxidants, conserving or disinfecting media. A few of the methods for the preparation of the chlorobenzamides of the invention as well as for agents containing them as active ingredient are described in more detail in the following examples. Parts are by weight and degrees are degrees centigrade.

EXAMPLE 1

17.5 parts ($\frac{1}{10}$ mol) of o-chloro-benzoyl chloride (made from o-chlorobenzoic acid and thionyl chloride) are slowly added, while cooling, to a solution of 150 parts absolute benzene and 14 parts ($\frac{2}{10}$ mol) diethylamine. After stirring for one hour at room temperature the solution is filtered off from the separated diethylamine hydrochloride, which is washed with a little benzene, and the benzene then evaporated off. On distillation the residue yields a colourless, slightly viscous oil, boiling at 125–128° under 0.4 mm. pressure, which soon solidifies. By recrystallisation from petroleum ether (B. P. 40–70°) 2-chloro-benzoyl-diethylamide is obtained in the form of colourless prisms, M. P. 39–40°.

EXAMPLE 2

89 parts (0.5 mol) of sodium-2-chlorobenzoate is mixed with 73 parts (0.5 mol) of diethyl-carbamyl-chloride in a 500 ml. round-bottomed flask fitted with a ground-glass jointed condenser and the mixture slowly heated up in an oil-bath. A reaction sets in at about 150°, with the evolution of carbon dioxide. After the temperature has been maintained at 150–160° for another 3 hours, the reaction-mixture is diluted with water and the product extracted with ether. After the usual washing of the ethereal solution with dilute hydrochloric acid and dilute caustic soda solution it is dried and the ether evaporated off. On distillation, the residue yields a 65% yield of 2-chlorobenzoyl-diethylamide, B. P. at 0.4 mm. 125–127°.

EXAMPLE 3

16 parts ($\frac{1}{10}$ mol) of o-chlorobenzoic acid are mixed with 25 parts ($\frac{1}{10}$ mol) of p-toluene-N- diethyl-sulfamide in an open, round-bottomed flask and heated to approx. 250°. A gently exothermic exchange-reaction occurs (the temperature rises to 270°) in which the diethylamido group becomes attached to the o-chlorobenzoyl group. After cooling, the toluene sulfonic acid formed is extracted with water and 2-chlorobenzoyl-diethylamide, M. P. 39–40°, obtained from the solid residue by recrystallising from benzene-petroleum ether.

The compounds listed in the following table can be obtained in ways similar to those described in the foregoing:

| Formula | M. P. | mm | Boiling point |
|---|---|---|---|
| Cl–C₆H₄–CO–N(CH₂–CH=CH₂)₂ | Degree ---------- | 0.3 | °C. 137–138 |
| Cl,Cl–C₆H₃–CO–N(C₂H₅)₂ | 63–64 | 13 | 176–178 |
| Cl,Cl–C₆H₃–CO–N(CH₂–CH=CH₂)₂ | ---------- | 0.2 | 133–135 |

7. EXAMPLES OF AGENTS MADE UP OF SEVERAL CONSTITUENTS

A. *Dusting powder*

30 parts of active ingredient (e. g., o-chloro-benzoyl-diethylamide or another of the amides described hereinbefore) are ground in a ball-mill with 70 parts of talc until they are evenly distributed.

B. *Solution*

20 parts of active ingredient and 2 parts of castor oil are dissolved in 78 parts of isopropanol.

C. *Emulsion*

20 parts of active ingredient are mixed with 20 parts of a fatty acid-ester-sulfonate. Before use this mixture is poured into water while stirring, so as to produce a milky emulsion.

D. *Cream*

A stearate cream prepared from 8 parts paraffin, 15 parts stearic acid, 5 parts wool grease, 2 parts wax, 3 parts glycerine, 1 part triethanolamine, 58.5 parts water and 0.5 part conc. ammonia by stirring the glycerol, triethanolamine, water and ammonia into a melt of the other components (melted at 80°) is stirred up with 17 parts of active ingredient (molten or finely ground).

The chlorobenzamides hereinbefore defined have been tested for their effectiveness in repelling insects. Some tests were carried out, for example, with Stomoxys, as follows: The substance under examination is dissolved in acetone at various concentrations. 0.1 ml. of solution is painted on the back of each of a number of white mice, the area painted being 5 x 2 cm. Mice treated in this way are transferred after 24, 39 and 48 hours for 10 minutes at a time to a box containing 50 to 100 hungry Stomoxys and observed. It was ascertained in this way that a 5% solution of o-chloro-benzoyl-diethyl-amide, o-chloro-benzoyl-diallylamide or 2.4-dichloro-benzoyl-diethylamide, or a 10% solution of 2.4-dichloro-benzoyl-diallylamide protected the mice for at least 24 hours from being stung by Stomoxys.

What we claim is:

The compound o-chloro-benzoic acid diethylamide.

HENRY MARTIN.
ALFRED MARGOT.
OTTO NERACHER.
WALTER SCHINDLER.
ERNST HODEL.

REFERENCES CITED

The following references are of record in the file of this patent:

UNITED STATES PATENTS

| Number | Name | Date |
|---|---|---|
| 2,302,159 | Wasum | Nov. 17, 1942 |
| 2,408,389 | Gertler | Oct. 1, 1946 |
| 2,465,470 | Omohundro | Mar. 29, 1949 |

OTHER REFERENCES

OSRD Insect Control Committee Report No. 16, Interim Report No. 0–87; Feb. 1, 1945, pp. 49, 83, 100, 127, Orlando Nos. 0–6088, 0–4215, 0–4003, 0–4254.

OSRD Insect Control Committee Report No. 28, Interim Report No. 0–94; May 18, 1945, page 34, Orlando No. 0–4369.

Montagne: "Rec. Trav. Chim. Pays Bas," vol. 19 (1900) pp. 56–58.

Chemical Abstracts, vol. 27 (1933), page 5727 (abstract of Dey et al., "J. Indian Chem. Soc.," vol. 10 (1933), pp. 353–359.